(12) United States Patent
Hsiao

(10) Patent No.: US 7,163,730 B2
(45) Date of Patent: Jan. 16, 2007

(54) OPTICAL INFORMATION STORAGE MEDIUM AND METHOD FOR MANUFACTURING THE SAME

(75) Inventor: Tsai-Chu Hsiao, Chung-Li (TW)

(73) Assignee: Prodisc Technology Inc., Taipei Hsien (TW)

( * ) Notice: Subject to any disclaimer, the term of this patent is extended or adjusted under 35 U.S.C. 154(b) by 161 days.

(21) Appl. No.: 10/916,458

(22) Filed: Aug. 12, 2004

(65) Prior Publication Data
US 2005/0213485 A1 Sep. 29, 2005

(30) Foreign Application Priority Data
Mar. 25, 2004 (TW) .............................. 93108208 A (51) Int. Cl.
*B32B 3/02* (2006.01)
(52) U.S. Cl. ................ 428/64.4; 428/64.8; 430/270.12
(58) Field of Classification Search ............... 428/64.5, 428/64.4, 64.8; 430/270.12
See application file for complete search history.

(56) References Cited

U.S. PATENT DOCUMENTS

| | | | | |
|---|---|---|---|---|
| 5,641,606 A | * | 6/1997 | Suzuki et al. ........... | 430/270.13 |
| 6,221,557 B1 | * | 4/2001 | Harigaya et al. ....... | 430/270.13 |
| 2004/0191683 A1 | * | 9/2004 | Nishihara et al. ...... | 430/270.11 |
| 2005/0207331 A1 | * | 9/2005 | Shinkai et al. .............. | 369/288 |
| 2005/0265217 A1 | * | 12/2005 | Ootera ........................ | 369/283 |
| 2006/0003135 A1 | * | 1/2006 | Hsiao et al. ................ | 428/64.4 |

FOREIGN PATENT DOCUMENTS

JP 62-270388 * 11/1987

* cited by examiner

*Primary Examiner*—Bruce Hess
(74) *Attorney, Agent, or Firm*—Birch, Stewart, Kolasch & Birch, LLP (57) ABSTRACT

An optical information storage medium includes a first substrate, a first recording layer, a first reflective layer, a spacer layer, a second recording layer, a second reflective layer, and a second substrate. In this case, the first recording layer is disposed above the first substrate. The first reflective layer is disposed above the first recording layer. The spacer layer is disposed above the first reflective layer. The second recording layer is disposed above the spacer layer, and the second recording layer is made of an inorganic material. The second reflective layer is disposed above the second recording layer. The second substrate is disposed above the second reflective layer.

17 Claims, 10 Drawing Sheets

OPTICAL INFORMATION STORAGE MEDIUM AND METHOD FOR MANUFACTURING THE SAME

This Nonprovisional application claims priority under 35 U.S.C. § 119 (a) on Patent Application No(s). 093108208 filed in Taiwan, Republic of China on Mar. 25, 2004, the entire contents of which are hereby incorporated by reference.

BACKGROUND OF THE INVENTION

1. Field of Invention

The invention relates to an optical information storage medium and method for manufacturing the same and, in particular, to the optical information storage medium, which is a single side dual layer DVD-R, and method for manufacturing the same.

2. Related Art

Along with the coming multi-media generation, the electronic products need higher storage density and higher capacity in storage medium. Traditionally, the storage medium is divided into two categories. One is magnetic recording medium and the other is optical recording medium. The optical recording medium, which includes read only memory CD (CD-ROM), write-once CD (CD-R), rewritable CD (CD-RW), read only memory DVD (DVD-ROM), write-once DVD (DVD-R), rewritable DVD (DVD–RW, DVD+RW), and random memory DVD (DVD-RAM), gets the lager market share.

Facing the problem of fast growing information capacity needs, it is the goal of the industry to increase the storage capacity of storage medium. DVD has a larger information storage capacity, and, as a result, it has gained a giant share of the market. There are several kinds of DVD, such as single side single layer, dual side single layer, single side dual layer, and dual side dual layer. The storage capacities of these discs range from 4.7 GB to 17 GB.

If there is only one side with information data while the other side is a dummy, the capacity of the disc is about 4.7 GB, which is called a single side single layer DVD or DVD-5. If there is one side with dual layer information data, the capacity of the disc is about 8.5 GB, which is called a single side dual layer DVD or DVD-9. If utilizing the dual side dual layer technique, the capacity could be increased to 13.2 GB, which is called DVD-14, or 17 GB, which is called DVD-18. At present time, consumers have more acceptability on single side single layer DVD-5 and DVD-9 than others, because they do not have to "turn over the disc".

Figure 1:
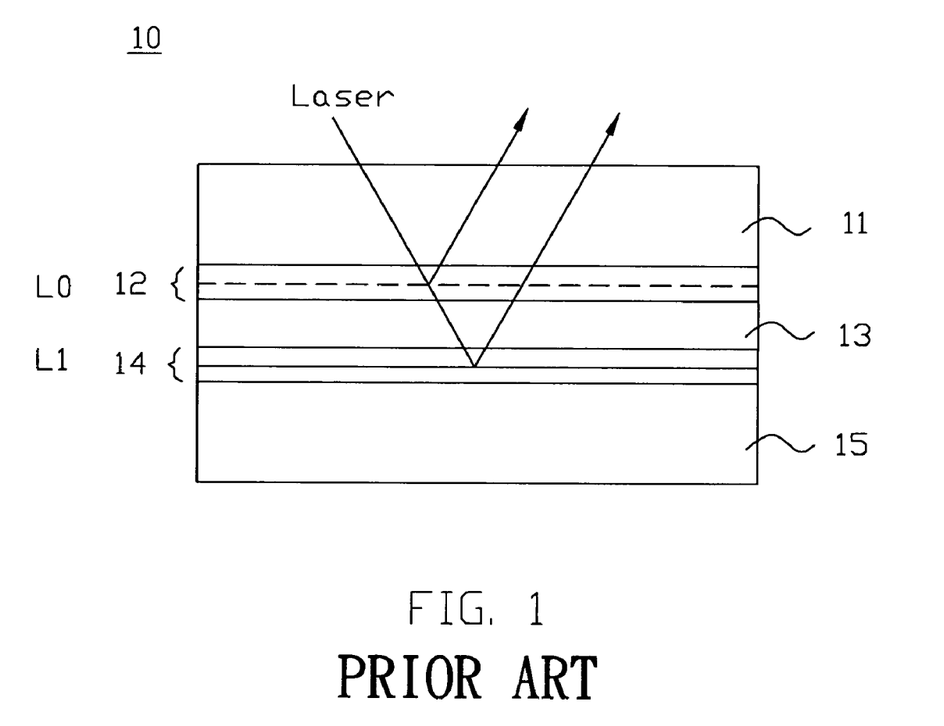
FIG. 1 is a schematic view of the conventional single side dual layer DVD.

Owing to large capacity and write-once feature, the single side single layer DVD-R also attracts people's attention. As shown in FIG. 1, conventional single side single layer DVD-R 10, has a first substrate 11, a first recording stack $L_0$ 12, a spacer layer 13, a second recording stack $L_1$ 14, and a second substrate 15. In this case, the first recording stack $L_0$ 12 and the second recording stack $L_1$ 14 are coated on the data side of the first substrate 11 and the second substrate 15 separately. The spacer layer 13 is sandwiched between the first recording stack $L_0$ 12 and the second recording stack $L_1$ 14. When reading data, the laser passes through the first substrate 11 to focus on the first recording stack $L_0$ 12 or passes through the spacer layer 13 to focus on the second recording stack $L_1$ 14.

The first recording stack $L_0$ 12 has a complex refractive index, $R_{L0}$, and a transmission value $T_{L0}$. The second recording stack $L_1$ 14 has a complex refractive index, $R_{L1}$. To fit the requirement of standard DVD-ROM player, the following conditions are fulfilled in the single side single layer DVD-R: $0.45 \leq T_{L0} \leq 0.75$, $0.18 \leq R_{L0} \leq 0.30$, and $0.40 \leq R_{L1} \leq 0.80$. But in the real manufacturing process, the reflectivity of the phase change material is usually low (about 7%), it can not meet the requirement of the standard DVD-ROM player. Such low reflection values severely reduce read-back compatibility on existing DVD players.

Generally, the first recording stack $L_0$ includes a recording layer and a reflective layer and the second recording stack $L_1$ also includes a recording layer and a reflective layer.

According to a larger storage capacity single side single layer DVD-R 20 in the prior art, the manufacture processes are divided into two different kinds. One is photo-polymerization process (2P process), and the other is non-2P process. Hereafter, the two processes are introduced.

Figure 2:
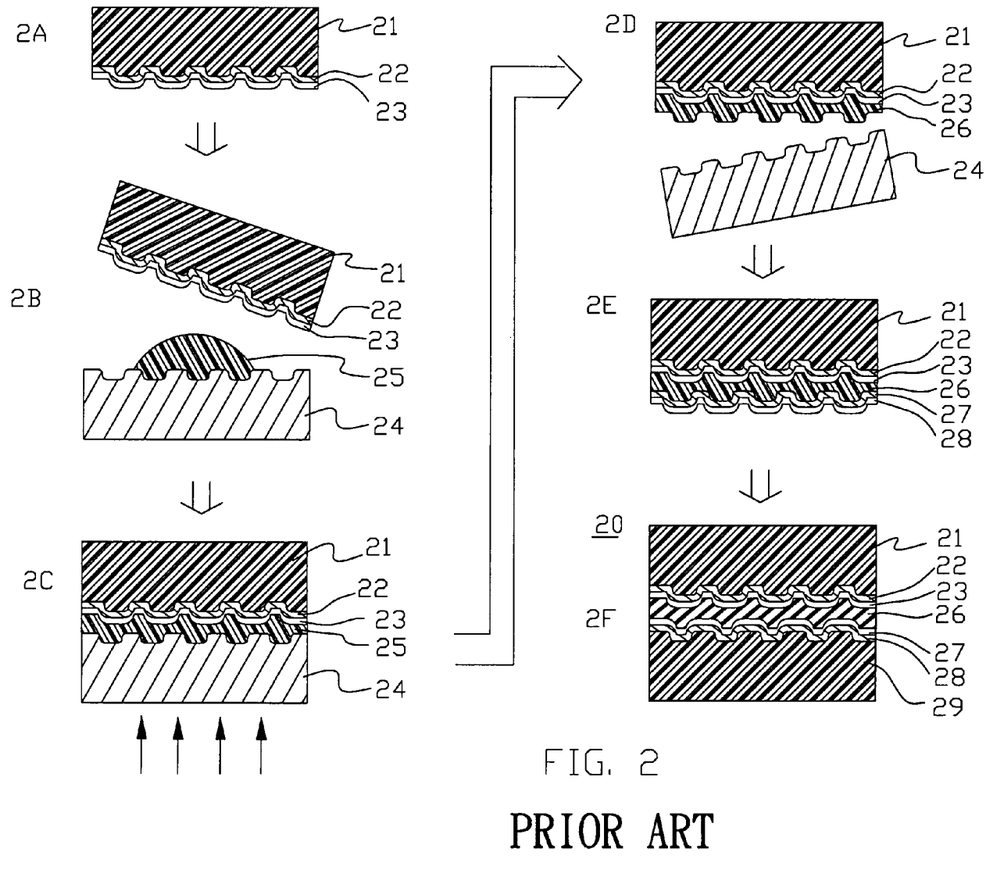
FIG. 2 is schematic view of conventional 2P process for manufacturing single side dual layer DVD.

1. 2P process: referring to FIG. 2, a first organic dye layer 22 and a first reflective layer 23 are formed on a pre-grooved first substrate 21 by spin coating. Spraying a photo-setting resin 25 on a pre-grooved master 24, then pressing the first reflective layer 23 and the master 24. After the radiation to solidify the resin, a spacer layer 26 is formed. Peeling off the master 24, a second organic dye layer 27 and a second reflective layer 28 are formed on the grooved spacer layer 26. Finally, a second substrate 29 is formed.

Figure 3:
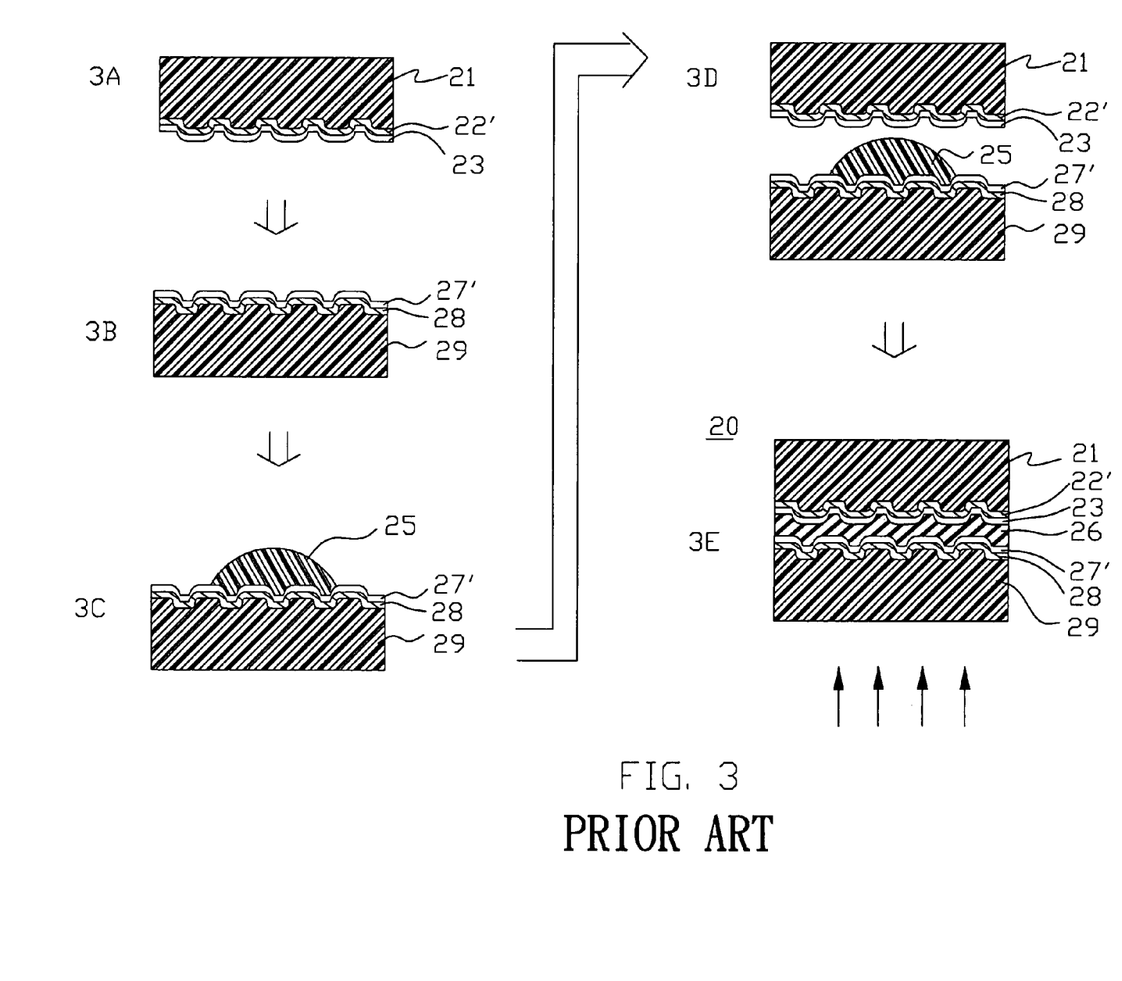
FIG. 3 is a schematic view of conventional non-2P process for manufacturing single side dual layer DVD.

2. Non 2P process: referring to FIG. 3, a first recording layer 22' and a first reflective layer 23 are formed on a pre-grooved first substrate by sputtering or evaporation. A second reflective layer 28 and a second recording layer 27' are sputtered or evaporated sequentially on a pre-grooved second substrate 29. In the case, the first recording layer 22' and the second recording layer 27' are made of phase change material. The first reflective layer 23 and the second recording layer 28 are bonded by photo-setting resin 25. A spacer layer 26 is formed after solidifying the photo-setting resin 25 and the process is completed.

However, owing to the peeling off step of 2P process, the yield of the process is usually low, which increase the cost of manufacturing process.

On the other hand, the discs made by non 2P process although avoid the peeling off step, and the yield of the process is improved. But the phase change material still can not meet the requirement of the dual layer reflectivity of DVD-ROM standard, also limit the market size.

Figure 4:
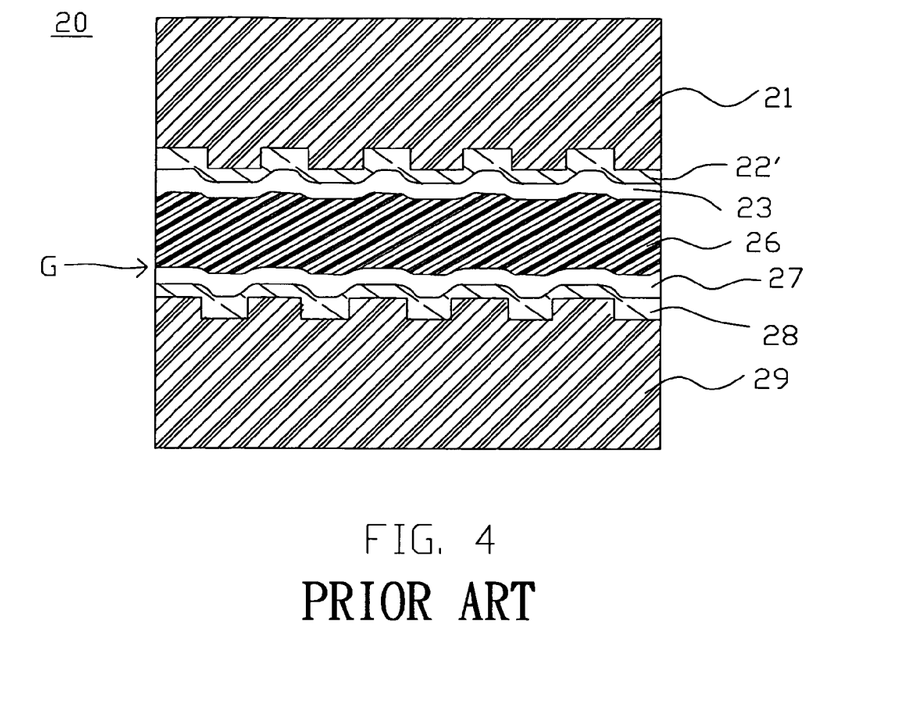
FIG. 4 is a schematic view of the flatness of the groove pattern in the non-2P process for manufacturing single side dual layer DVD.

Referring to FIG. 4, if replace the phase change material with the organic dye as the recording layer, and spin-coat it to form the reflective layer and recording layer, the surface of the grooves on the first substrate 21 and the second substrate 29 will be flatten. Because of the flatness of the groove pattern G between the spacer layer 26 and the second organic dye layer 27, it is difficult for the pickup head of DVD player to tacking and leads to a bad signal while writing on the disc.

As described above, it is an important subjective to provide an optical information storage medium and method for manufacturing the same to solve the above-mentioned problems.

SUMMARY OF THE INVENTION

In view of the foregoing, the invention is to provide an optical information storage medium and method for manufacturing the same, which has an inorganic recording. The inorganic recording layer is formed by sputtering or evaporation.

To achieve the above, an optical information storage medium of the invention includes a first substrate, a first recording layer, a first reflective layer, a spacer layer, a second recording layer, a second reflective layer, and a second substrate. In this case, the first recording layer is disposed above the first substrate. The first reflective layer is disposed above the first recording layer. The spacer layer is disposed above the first reflective layer. The second recording layer is disposed above the spacer layer, and the second recording layer is made of inorganic material. The second reflective layer is disposed above the second recording layer. The second substrate is disposed above the second reflective layer.

The invention also provides a method for manufacturing an optical information storage medium includes steps of: forming a first recoding layer above a first substrate, forming a first reflective layer above the first recording layer, forming a second reflective layer above a second substrate, sputtering or evaporating a second recording layer above the second reflective layer, and bonding the first substrate and the second substrate.

As mentioned above, the invention provides a second recording layer formed by sputtering or evaporation an inorganic material. The second recording layer is formed by sputtering or evaporation in the invention, which is formed along the grooves of the second substrate. Comparing with the prior art, the second recording layer of the invention does not have the disadvantage of flatness owing to spin-coating, which makes the problem of the optical pickup head to tracking. Moreover, the second recording layer is made of oxidation reduction exothermic material. The recording layer has enough reflectivity of the recording layer compared to the prior art, which forms the second recording layer by sputtering or evaporation with phase change material and does not meet the standard of the dual layer DVD-ROM player. Meanwhile, applying the non-2P process to manufacturing the single side dual layer DVD-R improves the yield and results in cost reduction.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The optical information storage medium according to preferred embodiments of the invention will be described herein below with reference to the accompanying drawings, wherein the same reference numbers refer to the same elements.

The optical information storage medium of the invention includes a write-once DVD (DVD-R). In the current embodiment, it takes the single side dual layer DVD-R manufactured by non-2P process as a preferred embodiment for the optical information storage medium.

Figure 5:
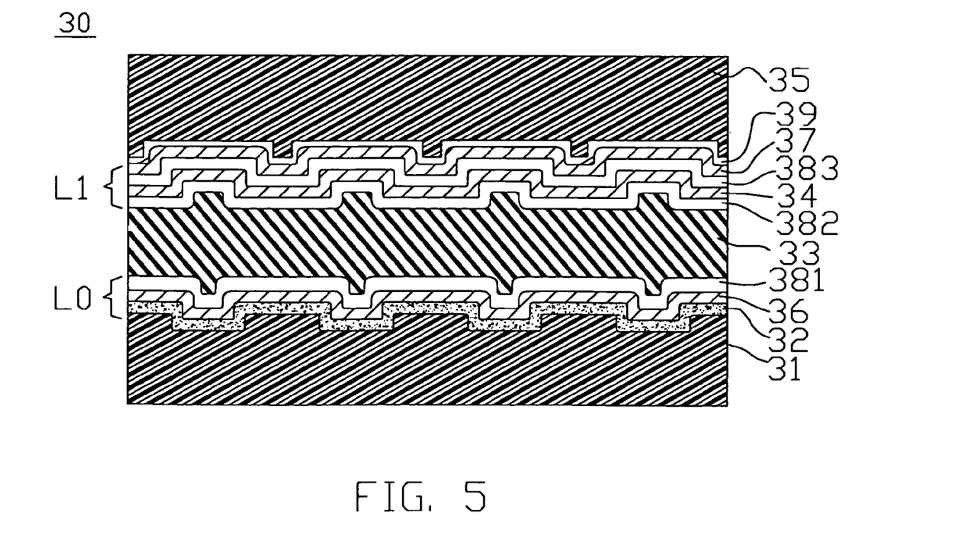
FIG. 5 is a schematic view of the optical information storage medium of the invention.

Referring to FIG. 5, the optical information storage medium 30 includes a first substrate 31, a first recording layer 32, a first reflective layer 36, a spacer layer 33, a second recording layer 34, a second reflective layer 37, and a second substrate 35.

The first substrate 31 and the second substrate 35 are often made of polycarbonate (PC), which has a good optical feature and chemistry stability. In the current embodiment, the first substrate 31 and the second substrate 35 are formed by PC injection molding with pre-grooved substrate.

The first recording layer 32 is disposed above the first substrate 31. The first recording layer 32 is made of organic dye or inorganic material. In this case, the first recording layer 32 is made of organic dye and formed by spin-coating method.

The first reflective layer 36 is disposed above the first recording layer 32. The first reflective layer 36 is a semi-reflective layer, which is made of metal of alloy, such as silver or silver alloy, aluminum or aluminum alloy, gold or gold alloy. The first reflective layer 36 is often formed by sputtering or evaporation.

The spacer layer 33 is disposed above the first reflective layer 36. The spacer layer 33 is made of a photo-setting resin, which is liquid at the beginning but after the radiation emitting, it is solidified and become a solid resin. The thickness of the resin is about 50 μm, which is for distinguishing the lights coming from different recording layer.

The second recording layer 34 is disposed above the spacer layer 33. The second recording layer 34 is made of an inorganic material or an oxidation reduction exothermic material. In the current embodiment, the material of the second recording layer 34 is at least one selected from the group consisting of $GeS_2$, $Ag_8GeS_6$, $Ag_3AsS_3$, and sulfur-containing material.

The second reflective layer 37 is disposed above the second recording layer 34. The second recording layer 34 is a semi-conductive or conductive alloy film. In the current embodiment, the second reflective layer 37 is a Ge-doped Sn-Bi alloy film.

The second substrate 35 is disposed above the second reflective layer 37.

Besides, this embodiment of the invention further comprises a first dielectric layer 381 between the first reflective layer 36 and the spacer layer 33, which could increase the reflectivity of the first reflective layer 36. Moreover, the embodiment of the invention further comprises a second dielectric layer 382 between the spacer layer 33 and the second recording layer 34. The material of the second dielectric layer 382 is at least one selected from the group consisting of silicon nitride, aluminum nitride, aluminum oxide, aluminum oxynitride, tantalum oxide, zinc sulfide-silicon oxide, and silicon carbide.

The embodiment of the invention further comprises a third dielectric layer 383 between the second recording layer 34 and the second reflective layer 37. The material of the third dielectric layer 383 is at least one selected from the group consisting of silicon nitride, aluminum nitride, aluminum oxide, aluminum oxynitride, tantalum oxide, zinc sulfide-silicon oxide, and silicon carbide.

In this embodiment, the first recording layer 32, the first reflective layer 36, and the first dielectric layer 381 are called the first recording stack $L_0$. On the other hand, the second recording layer 34, the second reflective layer 37, and the second dielectric layer 382 are called the second recording stack $L_1$. The laser light comes from the $L_1$ side. The first recording stack $L_0$ has a complex reflective value $R_{L0}$ an a transmission value $T_{L0}$, and the second recording stack $L_1$ has a transmission value $R_{L0}$. When the following conditions are fulfilled: $0.45 \leq T_{L0} \leq 0.75$, $0.18 \leq R_{L0} \leq 0.30$, and $0.40 \leq R_{L1} \leq 0.80$, a dual stack write-once medium is achieved, which can be played in a standard DVD-ROM player. As a result, the optical information storage medium 30 in this embodiment of the invention has achieved the standard of the DVD-ROM player and has the advantage of backward compatibility.

The embodiment of the invention further comprises a protection layer 39 between the second reflective layer 37 and the second substrate 35. In the embodiment, the protection layer 39 is formed by sputtering, and the material of the protection layer 39 is at least one selected from the group consisting of silicon nitride, aluminum nitride, aluminum oxide, aluminum oxynitride, tantalum oxide, zinc sulfide-silicon oxide, and silicon carbide.

The preferred embodiment of the invention is described with following FIG. 6 to FIG. 10.

The optical information storage medium of the invention includes a write-once DVD (DVD-R). In the current embodiment, it takes the single side dual layer DVD-R manufactured by non-2P process as a preferred embodiment of the manufacturing method for the optical information storage medium.

Figure 6:
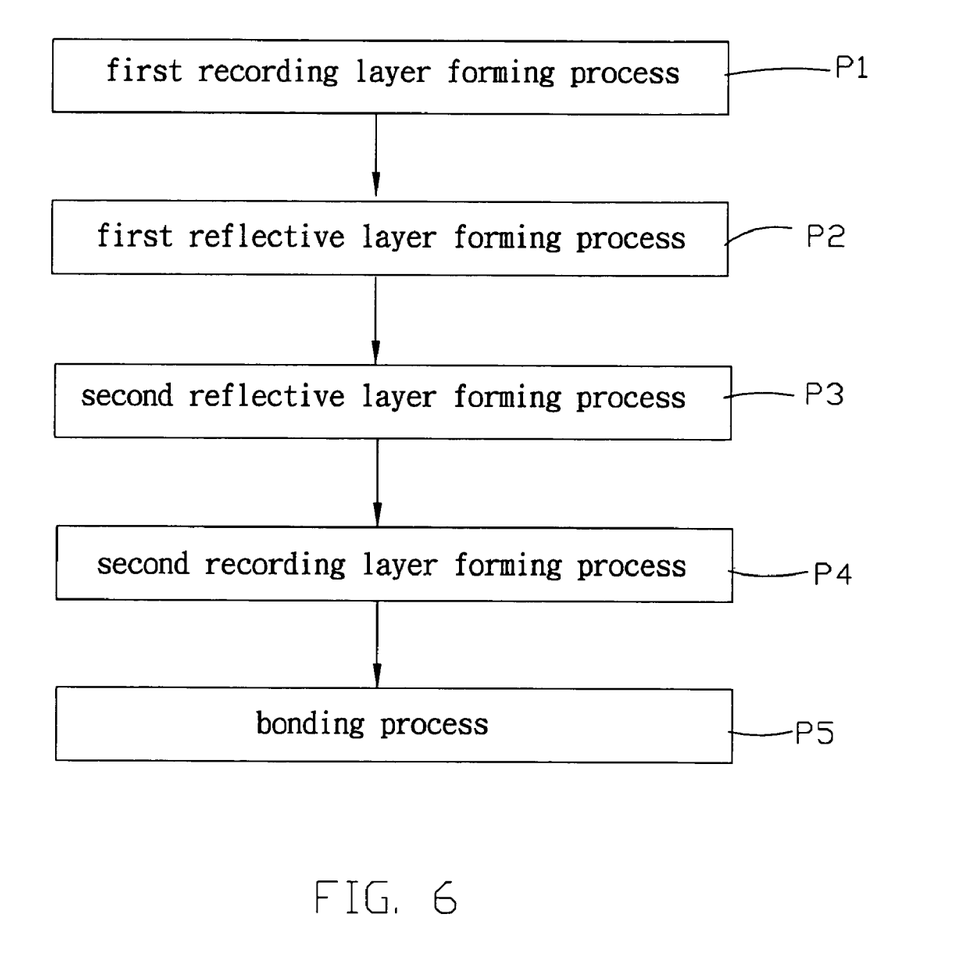
FIG. 6 is a flow chart of manufacturing the optical information storage medium of the invention.

Referring to FIG. 6, the preferred embodiment of the manufacturing method for the optical information storage medium includes a first recording layer forming process P1, a first reflective layer forming process P2, a second reflective layer forming process P3, a second recording layer forming process P4, and a bonding process P5.

Figure 7:
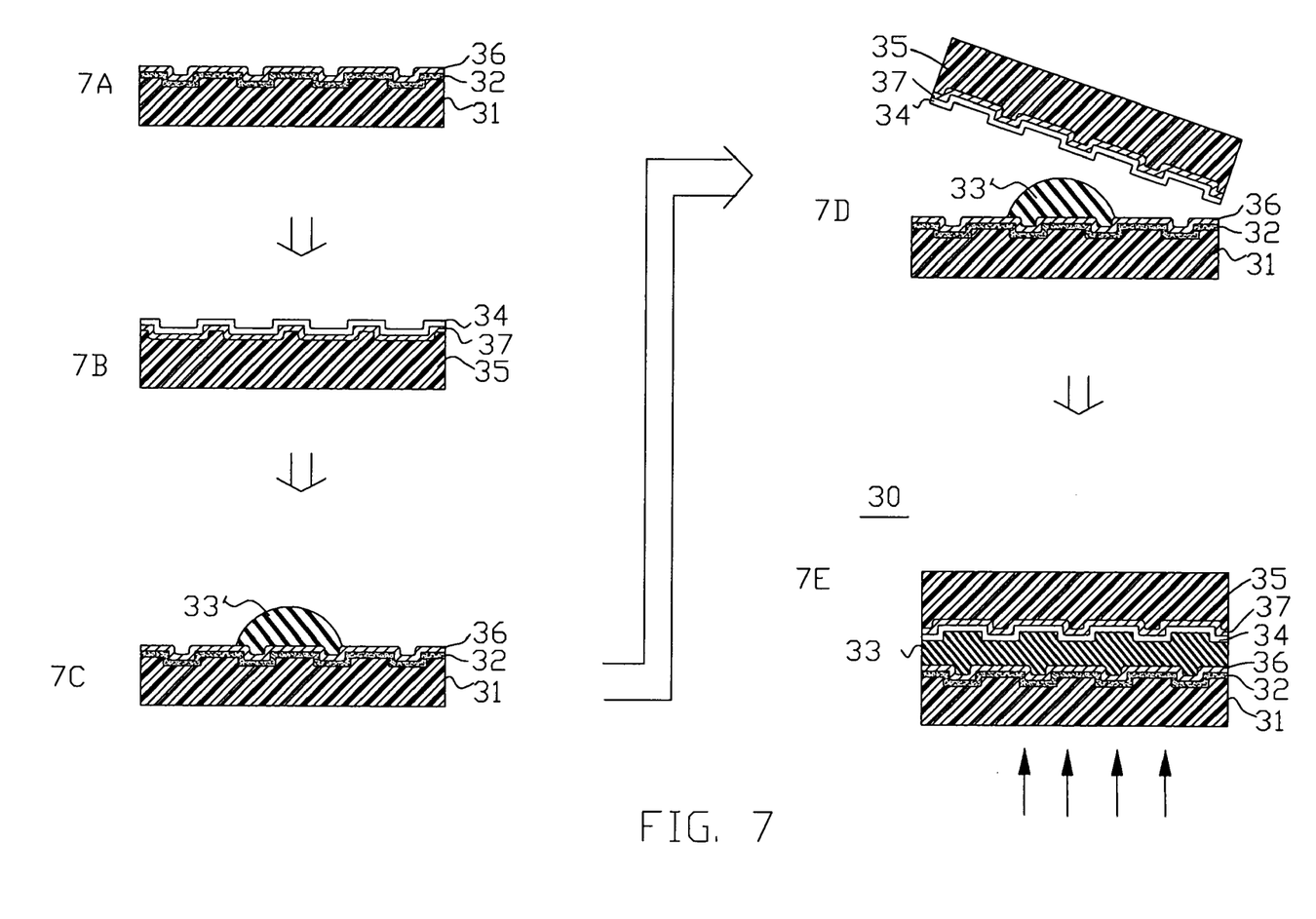
FIG. 7 is a schematic view of manufacturing the optical information storage medium of the invention.

As shown in FIG. 6 and FIG. 7, in the first recording layer forming process P1, a first recording layer 32 is spin-coated above a first substrate 31. In this case, the first substrate 31 is formed by polycarbonate injection molding and becomes a pre-grooved substrate. The first recording layer 32 is made of an organic dye.

According to FIG. 6 and FIG. 7, in the second reflective layer forming process P3, a second reflective layer 37 is sputtered or evaporated above a pre-grooved second substrate 35. Forming by sputtering or evaporation, hence the second reflective layer 37 is formed along the grooves pattern of the second substrate 35 and do not result in flatness of the groove pattern.

Referring to FIG. 6 and FIG. 7, in the second recording layer forming process P4, a second recording layer 34 is formed above the second reflective layer 37. The second recording layer 34 is made of an oxidation reduction exothermic material. In current embodiment, the material of the second recording layer 34 is at least one selected from the group consisting of $GeS_2$, $Ag_8GeS_6$, $Ag_3AsS_3$, and sulfur-containing material. Forming by sputtering or evaporation, hence the second recording layer 34 is formed along the grooves pattern of the second recording layer 34 and the second substrate 35 and do not result in flatness of the groove pattern.

Figure 8:
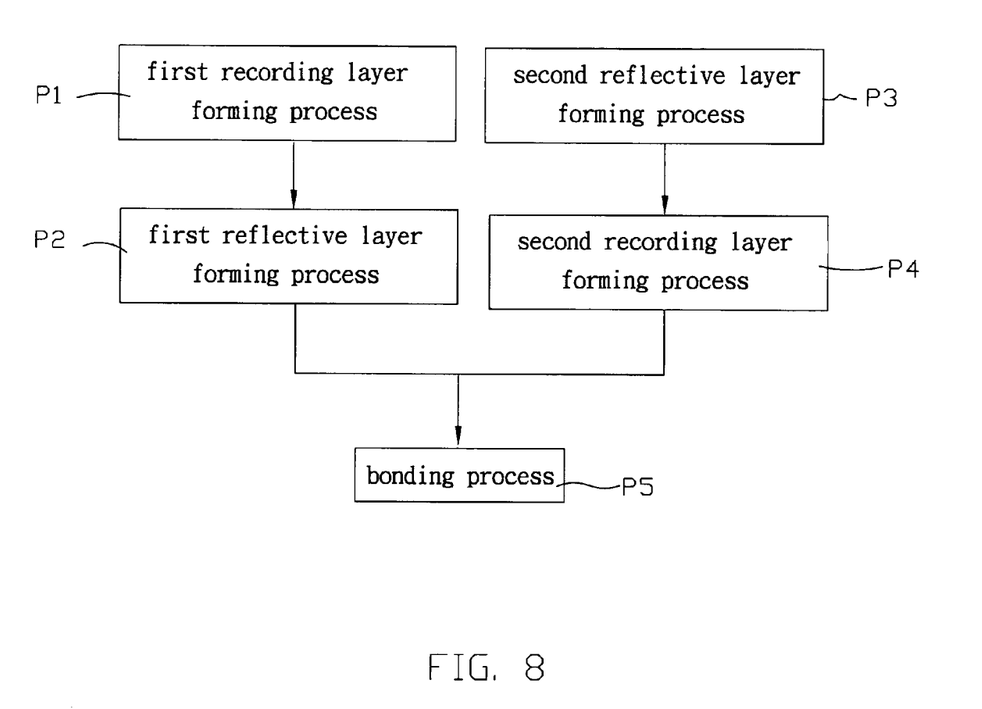
FIG. 8 is another flow chart of manufacturing the optical information storage medium of the invention.

Certainly, the manufacturing method for the optical information storage medium in the embodiment, as shown in FIG. 7 and FIG. 8, the first recording layer forming process P1 followed by the first reflective layer forming process P2 on the first substrate 31, and the second reflective layer forming process P3 followed by the second reflective layer forming process P5 on the second substrate 35, can be processed at the same time. Then, the bonding process P5 is processed together.

Figure 9:
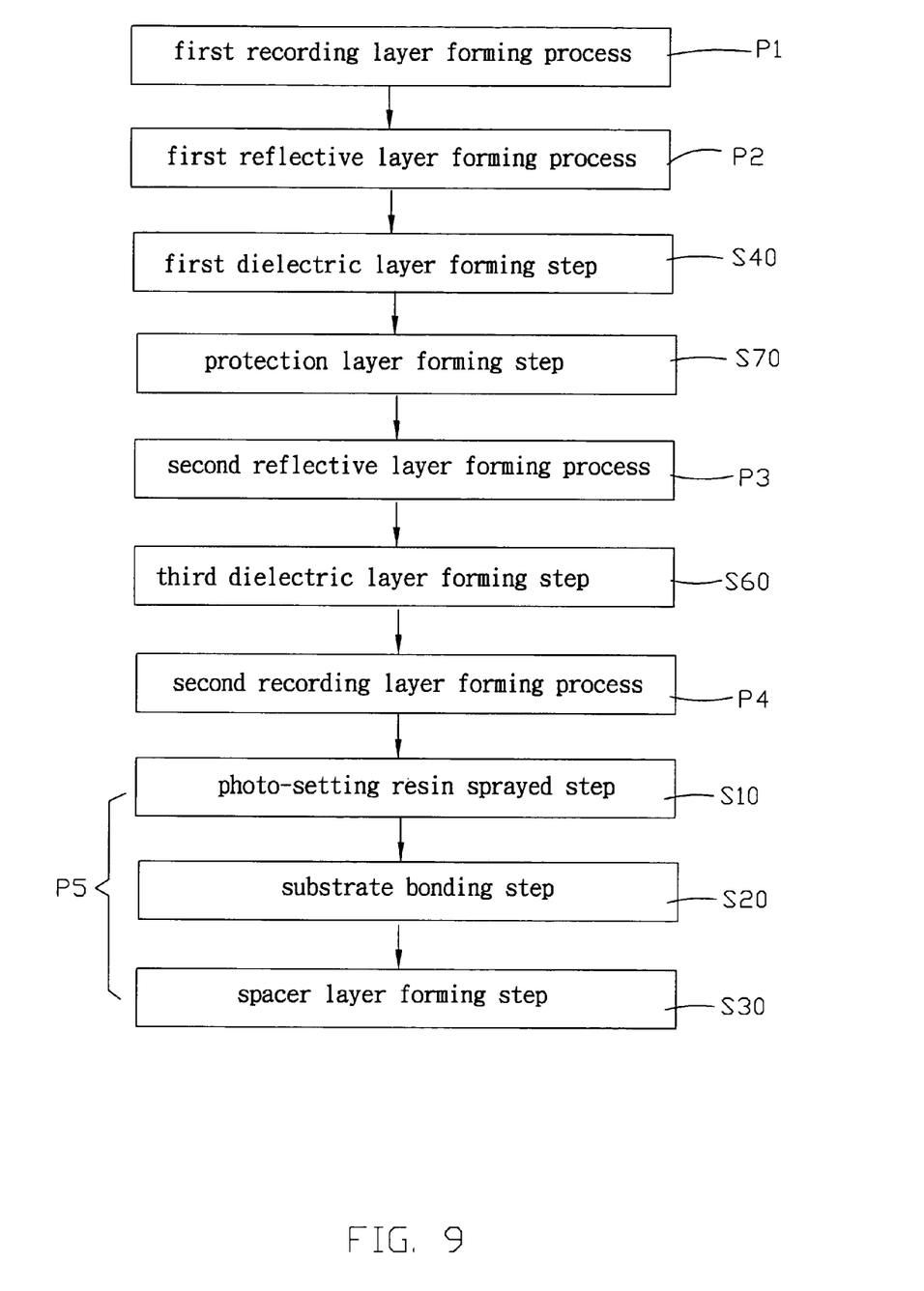
FIG. 9 is another flow chart of manufacturing the optical information storage medium of the invention.

Referring to FIG. 7 and FIG. 9, in the bonding process P5, there are three steps including a photo-setting resin spraying step S10, a substrate bonding step S20, and a spacer forming step S30.

In the photo-setting resin spraying step S10, a bonding layer 33' made of a photo-setting resin is sprayed on the first reflective layer 36 or on the second recording layer 34.

In the substrate bonding step S20, the first substrate 31 and the second substrate 35 are bonded with the side having the information data.

In the spacer layer forming step 30, the bonding layer 33' is solidified by UV light radiation and formed a spacer layer 33. As a result, the optical information storage medium 30 is achieved.

Figure 10:
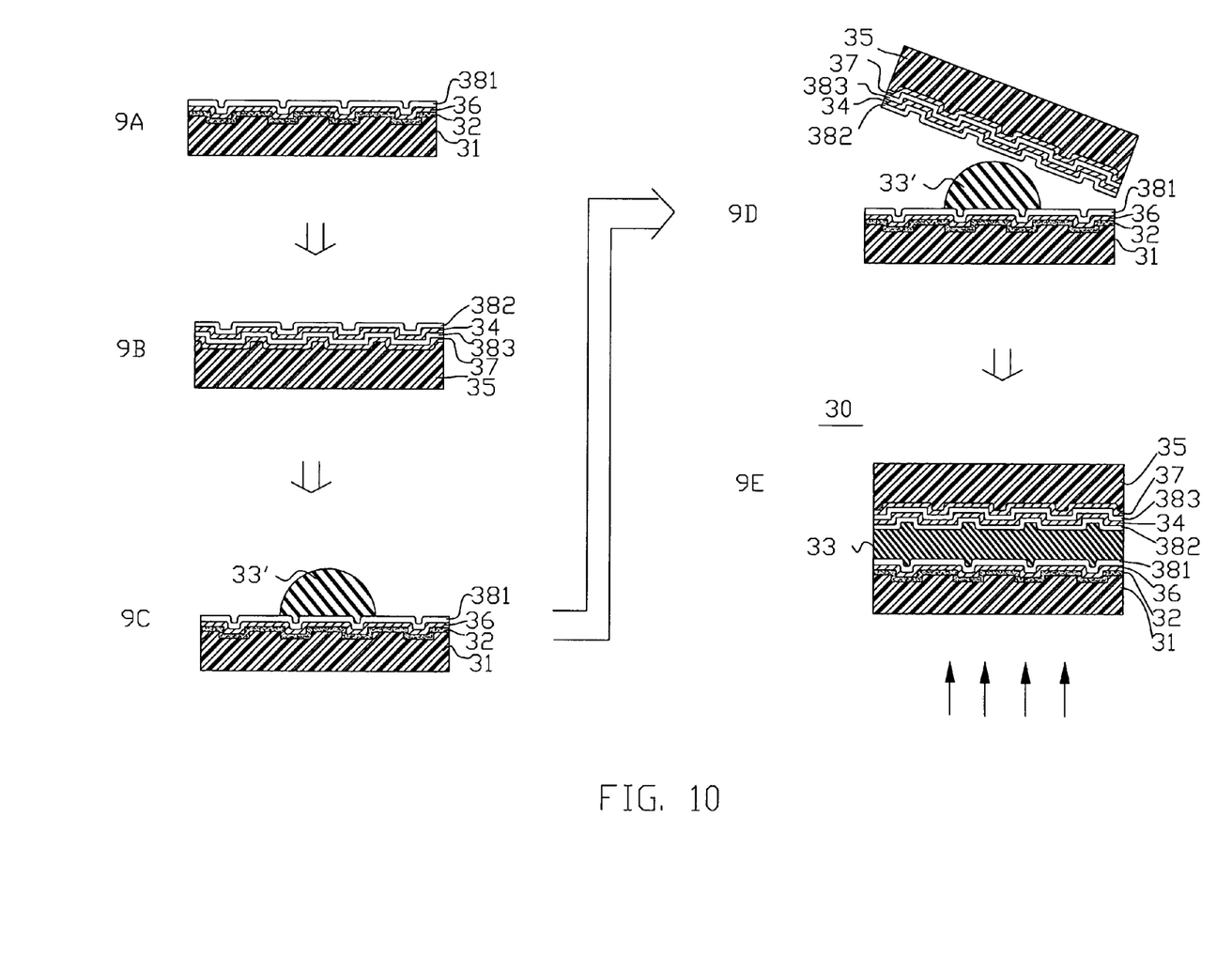
FIG. 10 is another schematic view of manufacturing the optical information storage medium of the invention.

As shown in FIG. 9 and FIG. 10, the embodiment of the invention further includes a first dielectric layer forming step S40. The first dielectric layer 381 is disposed on the first reflective layer 36, which could increase the reflectivity of the first reflective layer 36.

As shown in FIG. 9 and FIG. 10, the embodiment of the invention further includes a second dielectric layer forming step S40. The second dielectric layer 382 is disposed on the second recording layer 34. The material of the second dielectric layer 382 is at least one selected from the group consisting of silicon nitride, aluminum nitride, aluminum oxide, aluminum oxynitride, tantalum oxide, zinc sulfide-silicon oxide, and silicon carbide.

According to FIG. 9 and FIG. 10, the embodiment of the invention further includes a third dielectric layer forming step S60. The third dielectric layer 383 is disposed between the second recording layer 37 and the second reflective layer 37. The material of the third dielectric layer 383 is at least one selected from the group consisting of silicon nitride, aluminum nitride, aluminum oxide, aluminum oxynitride, tantalum oxide, zinc sulfide-silicon oxide, and silicon carbide.

Referring to FIG. 9 and FIG. 10, the embodiment of the invention further includes a protection layer forming step S70. The protection layer 39 is formed between the second reflective layer 37 and the second substrate 35. The material of the protection layer is at least one selected from the group consisting of silicon nitride, aluminum nitride, aluminum oxide, aluminum oxynitride, tantalum oxide, zinc sulfide-silicon oxide, and silicon carbide.

Figure 11:
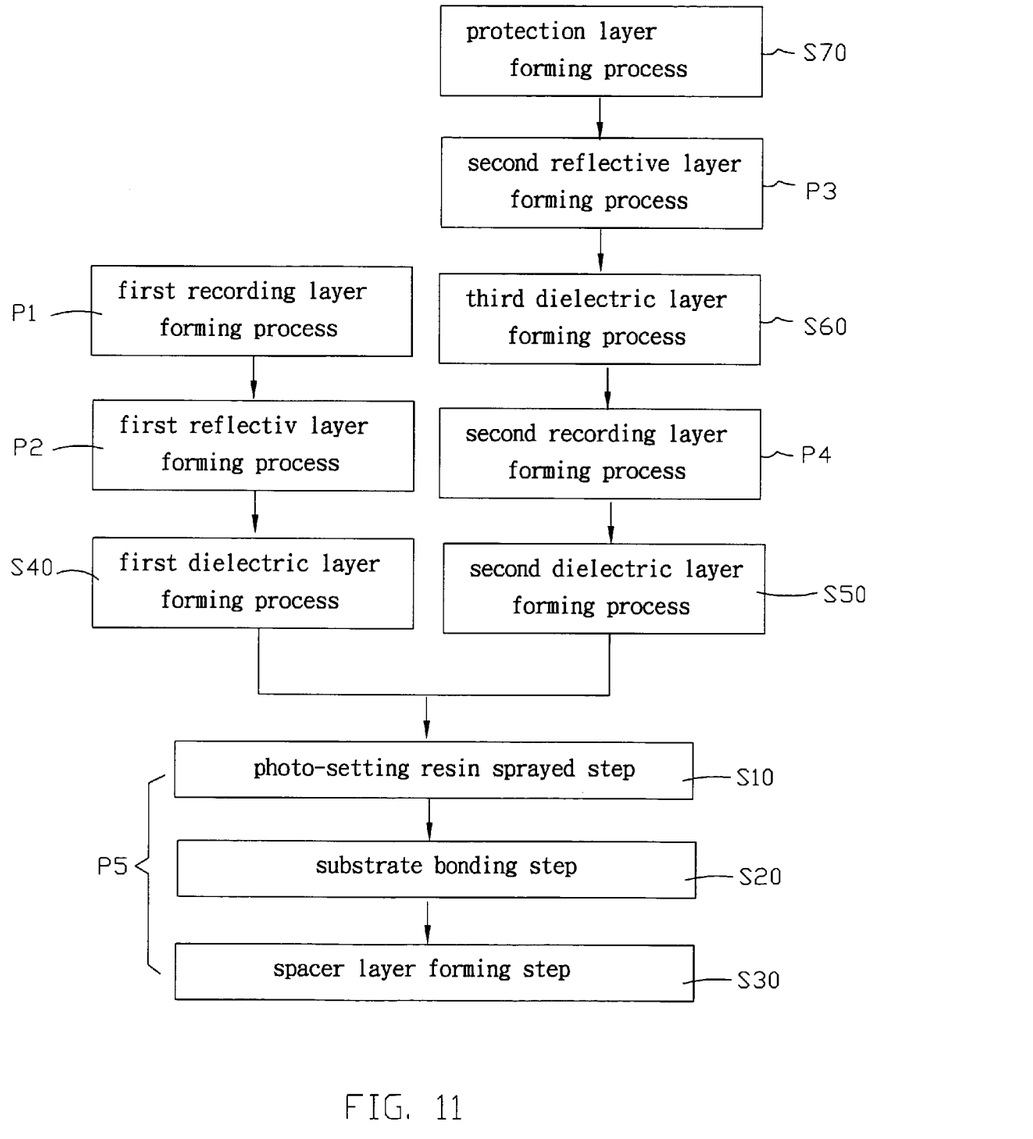
FIG. 11 is another flow chart of manufacturing the optical information storage medium of the invention.

Certainly, the manufacturing method for the optical information storage medium in the embodiment, as shown in FIG. 11, the first recording layer forming process P1 followed by the first reflective layer forming process P2, and the first dielectric layer forming step S40 on the first substrate 31; and the second reflective layer forming process P3 followed by the second reflective layer forming process P5, second dielectric layer forming process S50, and third dielectric layer forming step S60 on the second substrate 35, can be processed both together at the same time. Then, the bonding process P5 is processed.

As mentioned above, the invention provides a second recording layer formed by sputtering or evaporation an inorganic material. The second recording layer is formed by sputtering or evaporation in the invention, which is formed along the grooves patterns of the second substrate. Comparing with the prior art, the second recording layer of the invention does not have the disadvantage of flatness owing to spin-coating, which makes the problem of the optical pickup head to tacking. Moreover, the second recording layer is made of an oxidation reduction exothermic material. The recording layer has enough reflectivity of the recording layer compared to the prior art, which forms the second recording layer by sputtering or evaporation with phase change material and does not meet the standard of the dual layer DVD-ROM player. Meanwhile, applying the non-2P process to manufacturing the single side dual layer DVD-R improves the yield and results in cost reduction.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A write-once optical information storage medium, comprising:
    a first substrate;
    a first recording layer, which is disposed above the first substrate;
    a first reflective layer, which is disposed above the first recording layer;
    a spacer layer, which is disposed above the first reflective layer;
    a second recording layer, which is disposed above the spacer layer, and is made of an inorganic material, the inorganic material being at least one selected from the group consisting of $GeS_2$, $Ag_8GeS_6$, and $Ag_3AsS_3$;
    a second reflective layer, which is disposed above the second recording layer; and
    a second substrate, which is disposed above the second reflective layer.

2. The write-once optical information storage medium of claim 1, wherein the optical information storage medium is a single side dual layer digital versatile disc (DVD).

3. The write-once optical information storage medium of claim 1, wherein the first recording layer is made one selected from the group consisting of an organic dye, and an inorganic material.

4. The write-once optical information storage medium of claim 1, wherein the second recording layer is formed by sputtering or evaporation.

5. The write-once optical information storage medium of claim 1, further comprising:
    a first dielectric layer, which is positioned between the first reflective layer and the spacer layer.

6. The write-once optical information storage medium of claim 1, further comprising:
    a second dielectric layer, which is positioned between the spacer layer and the second recording layer.

7. The write-once optical information storage medium of claim 6, wherein the material of the second dielectric layer is at least one selected from the group consisting of silicon nitride, aluminum nitride, aluminum oxide, aluminum oxynitride, tantalum oxide, zinc sulfide-silicon oxide, and silicon carbide.

8. The write-once optical information storage medium of claim 1, further comprising:
    a third dielectric layer, which is positioned between the second recording layer and the second reflective layer.

9. The write-once optical information storage medium of claim 8, wherein the material of the third dielectric layer is at least one selected from the group consisting of silicon nitride, aluminum nitride, aluminum oxide, aluminum oxynitride, tantalum oxide, zinc sulfide-silicon oxide, and silicon carbide.

10. The write-once optical information storage medium of claim 1, further comprising:
    a protection layer, which is positioned between the second reflective layer and the second substrate.

11. The write-once optical information storage medium of claim 10, wherein the material of the protection layer is at least one selected from the group consisting of silicon nitride, aluminum nitride, aluminum oxide, aluminum oxynitride, tantalum oxide, zinc sulfide-silicon oxide, and silicon carbide.

12. A method for manufacturing an optical information storage medium, comprising:
    forming a first recoding layer above a first substrate, wherein the first recording layer is made of an organic dye;
    forming a first reflective layer above the first recording layer;
    forming a second reflective layer above a second substrate;
    sputtering or evaporating a second recording layer above the second reflective layer; and
    bonding the first substrate and the second substrate.

13. The method of claim 12, wherein the second recording layer is made of an inorganic material.

14. The method of claim 12, wherein the second recording layer is made of an oxidation reduction exothermic material.

15. The method of claim 12, wherein the material of the second recording layer is at least one selected from the group consisting of $GeS_2$, $Ag_8GeS_6$, $Ag_3AsS_3$, and sulfur-containing material.

16. The method of claim 12, further comprising:
    forming a bonding layer on the first recording layer or on the second recording layer, wherein the bonding layer is used to bond the first substrate and the second substrate.

17. The method of claim 12, further comprising:
    radiating the bonding layer so as to solidify the bonding layer to form a spacer layer.

* * * * *